United States Patent Office 3,835,063
Patented Sept. 10, 1974

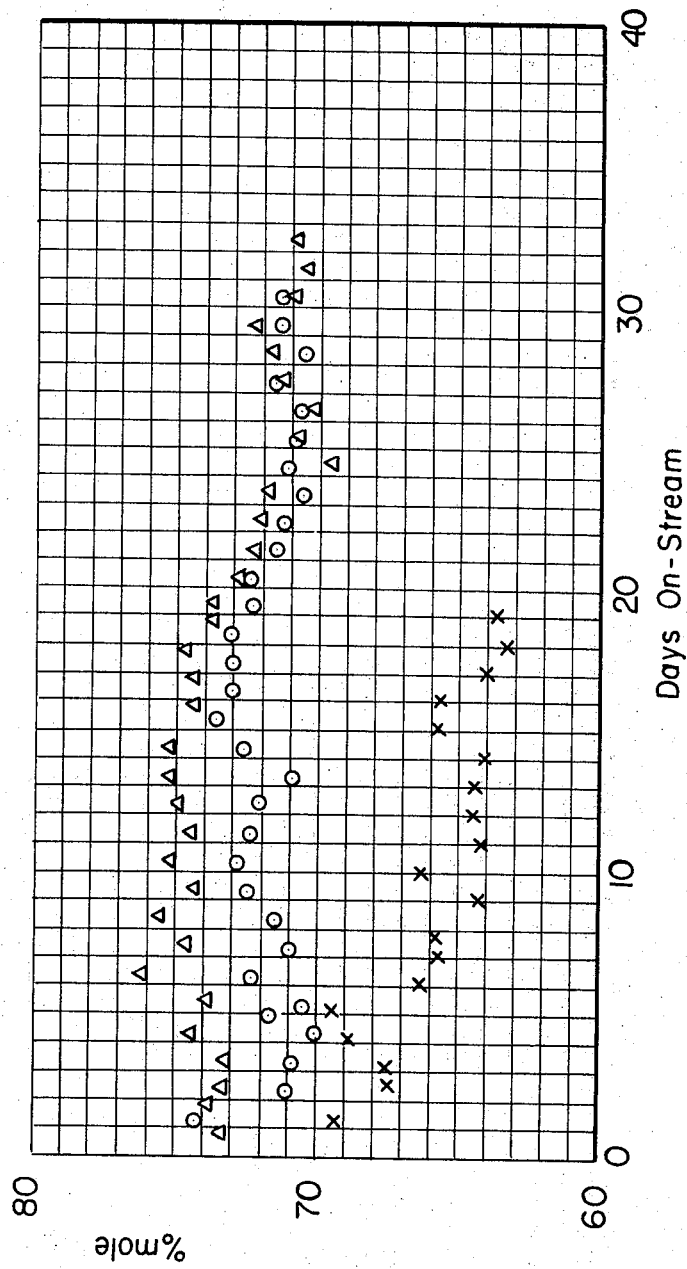

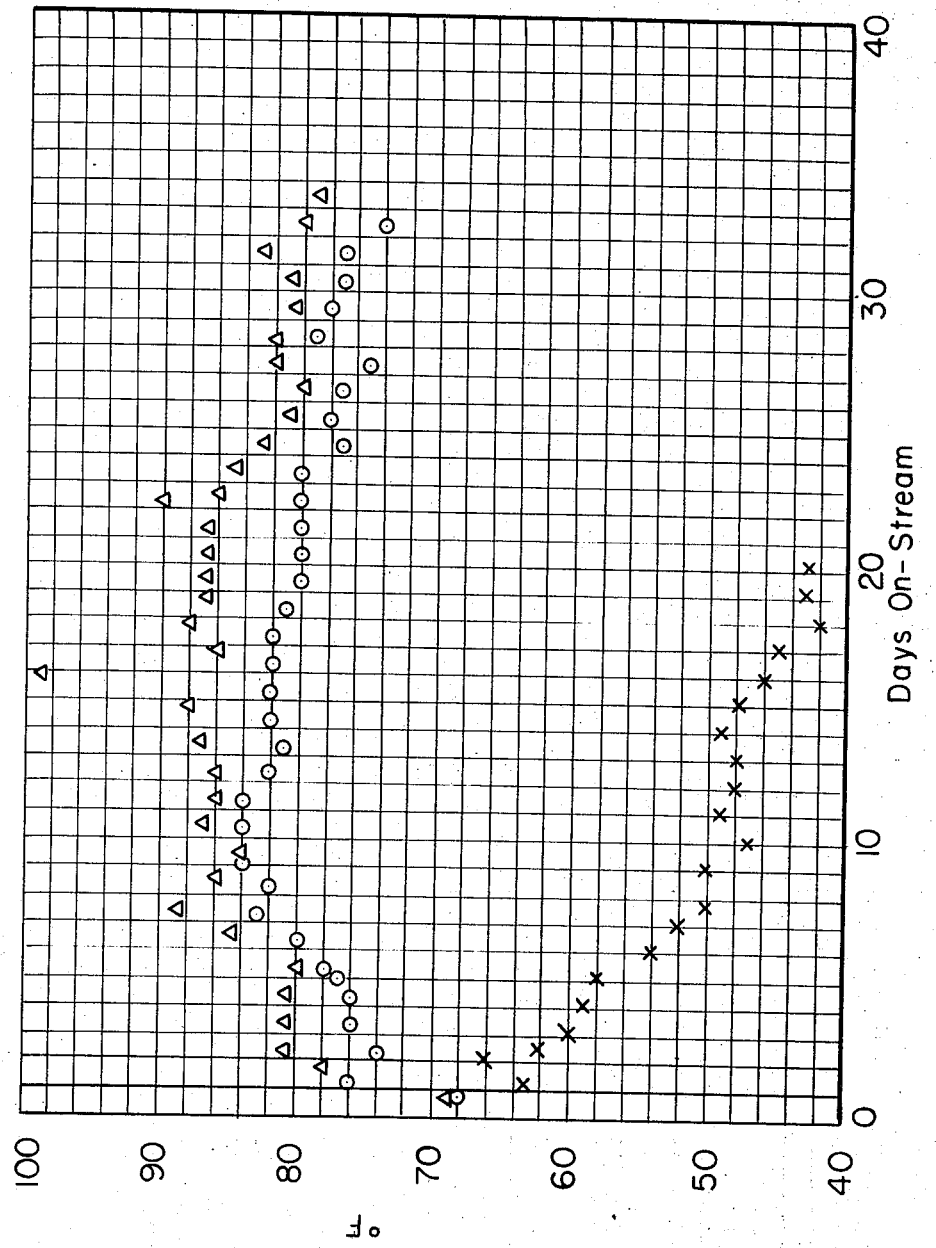

3,835,063
REGENERATION OF HALOGEN PROMOTED BIMETALLIC REFORMING CATALYST
Francis E. Davis, Jr., Woodbury, Walter R. Derr, Ashland, and Earle F. Ginter, Woodbury, N.J., assignors to Mobil Oil Corporation
Filed Mar. 27, 1970, Ser. No. 23,160
Int. Cl. B01j 11/18, 11/80; C10g 35/06
U.S. Cl. 252—415
3 Claims

ABSTRACT OF THE DISCLOSURE

A halogenated reforming catalyst comprising platinum which has become deactivated with carbonaceous deposits during on-stream reforming is regenerated by the combination of (1) removing carbonaceous material by burning with an oxygen containing gas under conditions to avoid heat damage to the catalyst, (2) heating the catalyst with air to a temperature of about 900° F., (3) selectively chlorinating each catalyst bed with a moisture saturated air stream to a predetermined chloride level, (4) reducing the chlorided catalyst with hydrogen rich gas for a period of time in the range of 1 to 4 hours, (5) adding sulfur to each catalyst bed theoretically sufficient to sulfide the platinum component of the catalyst and (6) initiating on-stream reforming of naphtha in the presence of added hydrogen sulfide.

BACKGROUND OF THE INVENTION

Reforming with platinum-alumina catalysts constitutes one of the major refinery processing routes for upgrading naphthas and relatively low grade gasoline boiling material to a higher octane product. During reforming the catalyst deactivates for several different reasons, one of which is concerned with loss of active catalyst sites due to the accumulation of carbonaceous matter and, in some instances, the accumulation of catalyst poisons. As the activity of the catalyst decreases during use compensation therefor is made by increasing the temperature to maintain relatively constant conversion of the feed to desired octane product. However, there is a limit to which the temperature may be raised and it thus becomes necessary to restore the activity and selectivity of the reforming catalyst as by regeneration. The present invention is particularly concerned with maintaining the activity and selectivity of reforming catalysts by regeneration.

SUMMARY OF THE INVENTION

An improved and novel procedure for regenerating a platinum reforming catalyst comprising halogen is described. The regeneration procedure described is particularly applicable to recently developed reforming catalyst known as bimetallic reforming catalyst such as those comprising platinum promoted with metal-halide complexes and require rechlorination as a part of the regeneration procedure.

More particularly the present invention is concerned with a procedure for regenerating halide promoted platinum reforming catalyst which has become deactivated with carbonaceous deposits by a combination of controlled regeneration steps which include burning to remove carbonaceous material from the catalyst, oxidation of the catalyst at elevated temperatures of 900° F., rechlorination and sulfiding of the catalyst before return to an on-stream reforming operation.

DESCRIPTION OF THE INVENTION

The present invention is concerned with the reforming of naphtha boiling hydrocarbons, the catalyst employed for effecting such reforming, and the maintenance of the catalyst at high levels of activity and selectivity. More particularly the present invention is concerned with the method for regenerating a reforming catalyst such as one comprising a platinum type metal selected from the group comprising platinum, palladium or rhodium promoted with halogen and/or a metal halide reactant modifier selected from the group consisting of cerium, ruthenium, rhenium, yttrium and other metallic elements which will complex with halogen. In another aspect the method of the present invention is concerned with the careful controls exercised in effecting the combination of contact steps which will be successful in restoring the activity and selectivity of a bimetallic halogen containing reforming catalyst after use thereof in a reforming operation.

The regeneration procedure of the present invention includes a controlled burning under limited temperature conditions to remove carbonaceous material from the catalyst followed by a relatively severe oxidation of the catalyst with substantially pure air at about 900° F. Thereafter the catalyst beds are depressured to remove carbon dioxide therefrom and repressured with air above about 50 p.s.i.g. This step may be repeated to assure removal of carbon dioxide. Thereafter the catalyst is contacted with moisture saturated air at an elevated temperature brought about by injecting steam into the recycle gas stream prior to the high pressure separator so that excess water will separate and be removed therefrom essentially in the high pressure separator. Thereafter, or substantially simultaneously with injection of steam, pressured chlorine gas is added to the water saturated air stream at the entrance of each reactor of the reforming process in a predetermined amount and a selected addition rate within the range of from about 300 to about 500 p.p.m. per volume of circulating gas.

The chlorination of the catalyst is effected with considerable precision so that the catalyst bed in each reactor (being in different amounts) will receive enough chlorine but not substantially more than that required to effect desired rechlorination of the catalyst. That is, restore its state of chlorination to essentially that as freshly prepared. Too much chlorine can be harmful to both the catalyst and equipment to which it is exposed. Therefore a large chlorine addition such as required in the third reactor because of its catalyst volume may be added at the higher rate of 500 p.p.m. per volume of circulating gas in the system with a lower chlorine addition rate as low as 300 p.p.m. being used in the other reactors of lower catalyst volume so that all the catalysts in the separate reactors will complete chlorination treatment at substantially the same time. After a theoretically predetermined amount of chlorine has been separately added to each reactor as explained above, the moisture laden air stream is continuously circulated through the system for a time period of at least two hours at a temperature of about 800° F. to about 950° F.

It has been found that the time for effecting oxidation of the catalyst after carbon removal and treatment with the moisture laden air stream including rechlorination of the catalyst should be effected in a time of at least 10 hours and preferably the time will be at least about 15 hours. However, the time should not extend beyond 18 or 20 hours and most usually will be about 16 hours.

Following the above oxidation and chlorination treatment of the catalyst it may be desirable to sample the catalyst. This may be accomplished after the catalyst is cooled to a temperature of about 500° F. and the system pressure is dropped to atmospheric or a lower pressure. In any event whether sampling of the catalyst is effected or not, it is important to purge the catalyst of oxygen and this can be best obtained by reducing the catalyst and system pressure to as low as 25 inch Hg vacuum and using nitrogen as purge gas. The purged system is then repressured to about 5 p.s.i.g. in preparation for reducing the catalyst with a hydrogen rich gas stream.

Reduction of the catalyst with hydrogen rich gas may be effected at substantially any elevated pressure depending upon the availability of such gas in a refinery system. In any event it is preferred that the catalyst be reduced at a pressure which is at least about 50 p.s.i.g. Pressures up to reforming pressures may also be used. However reduction of the catalyst is effected over an extended operating time in the range of about 2 hours up to about 4 hours, it being preferred for economic reasons to use not more than 3 hours. Reduction of the catalyst occurs as the temperature is raised from about 500° F. up to about 900 or 950° F. It is preferred that the catalyst be reduced for 2 hours at 900° F.

Following the above hydrogen processing and catalyst reducing step, the catalyst bed temperature is reduced to about 800° F., and sulfur as hydrogen sulfide is added to the catalyst on the basis of a theoretical amount sufficient to convert all of the platinum to a platinum sulfide. The hydrogen sulfide is added at a rate in the range of 80 to 100 p.p.m. of hydrogen sulfide to the circulating hydrogen gas stream passed through the catalyst beds. The addition of hydrogen sulfide is stopped if and when a breakthrough is noted from the catalyst beds. After sulfiding of the catalyst is completed the system is raised to a reforming pressure and naphtha charge is added to the system as early as possible to initiate the production of hydrogen rich gas. The system pressure is raised to desired reforming pressure as rapidly as possible. To enhance the initial stage of contact it is contemplated adding at least about 150 p.p.m. of sulfur as hydrogen sulfide with the naphtha hydrocarbon charge for an initial operating period of time adequate to suppress the initial high activity of catalyst. Such initial hydrogen sulfide addition may be practised up to about 1 or 2 hours of on-stream operation but generally it is less than about 2 hours.

In effecting the reforming of hydrocarbons with platinum reforming catalysts, it is the usual practice of the operator or refiner to employ a plurality of catalyst beds comprising at least 3 beds of catalyst in separate reactors arranged in a series and provided with means for heating reactant material passed to each catalyst bed. In some arrangements the first bed of catalyst will be a small volume of catalyst of lesser amount than that employed in the final reactor and usually the second catalyst bed will be equal to more, or less, than the volume of catalyst employed in the first reactor. The volume of catalyst employed in a third reactor, however, is usually equal to at least the sum of the catalyst volumes employed in the first two reactors but more usually is considerably greater in volume than the sum of these volumes.

In the reforming reactor and catalyst bed sequence above briefly discussed, the reactant stream comprising hydrogen and naphtha charge is sequentially passed in contact with the catalyst beds maintained under temperature pressure and space velocity conditions particularly selective for effecting dehydrogenation, hydrogenation, dehydrocyclization and isomerization of constituents comprising the naphtha boiling charge. The naphtha charge of gasoline boiling material to be upgraded may boil in the range of from about $C_5$ hydrocarbons up to about 400 or 420° F. More usually, however, the end boiling point of the charge will be in the range of about 380° F. and the initial boiling point will include $C_6$ hydrocarbons. The reforming temperatures employed are usually selected from within the range of 700° F. up to about 1050° F., it being preferred to employ temperatures in the range of from about 800° F. up to about 1025° F. The reforming pressure may be selected over a relatively wide range from as low as about 50 p.s.i.g. up to about 1000 p.s.i.g. However, it is preferred to effect the reforming operation at a pressure selected from within the range of about 100 to about 400 p.s.i.g. Pressures below 350 p.s.i.g. are particularly advantageous as well known at this stage of the art. The liquid hourly space velocity, on the other hand, may vary considerably depending upon temperature and pressure conditions selected to optimize the severity of the operation and thus may fall within the range of 0.1 up to about 10, but more usually is selected from within the range of 1 to 5 LHSV.

The present invention recognizes that a bimetallic noble metal reforming catalyst promoted with halogen and operated under carefully selected reforming conditions in conjunction with carefully selected conditions of moisture and chloride level will perfom operationally much more selectively as evidenced by improvement in the hydrogen purity of recovered recycle gas and reformate product yields for an extended on-stream operating period. It has also been found when operating with bimetallic catalyst under selective operating conditions that the liquid reformate product yields may be maintained at higher values than heretofore possible. This significant processing breakthrough with the halogen promoted bimetallic platinum reforming catalyst has been found to be particularly effective provided that not only are the on-stream conditions carefully controlled but that the catalyst undergoes a very selective regeneration to restore its activity after prolonged use.

As provided above the catalyst contemplated in the reforming operation of this invention comprise those containing metals of the platinum group, particularly platinum, palladium and rhodium in combination with one or more other metallic reactant modifiers or activating elements which form active catalyst complexes with a halogen promoter. Metallic activating agents or elements which may be employed in combination with platinum group metal include cerium, ruthenium, rhenium, yttrium and other elements which form highly complex molecules with a halogen such as chlorine. The concentration of the platinum group metal used in the reforming catalyst to provide hydrogenation-dehydrogenation activity will usually be selected to be within the range of 0.01 to about 2% by weight. More usually, however, the platinum group metal will be selected to be within the range of 0.15 up to about 1% by weight. Reforming catalysts comprising 0.35 and 0.6 wt. percent platinum have been used with considerable success. The metallic activating agent or halogen containing reaction modifier will be utilized in relatively small amounts similar or different from that of the platinum group metal and thus will constitute a relatively small part of the total catalyst complex. Generally the metallic promoting component will be used in amounts which are selected from within the range of 0.05% up to about 2% by wt. of the catalyst.

The metallic components above identified are deposited on a suitable carrier material which is usually an inorganic metal oxide and preferably is alumina in the gamma, eta or mixed form thereof. The carrier may be combined with other elements of the periodic table including zirconia, magnesia and titania. Other carrier materials which may be used include silica-alumina, silica-magnesia, silica-alumina-zirconia and alumina silicates. Halogen may be combined with catalyst by any one of the known methods of the prior art. For example, it may be added during preparation by using chloro-platinic acid or it may be added in the elemental gas form such as chlorine or fluorine. The halogen may also be added separately or with the naphtha charge stream as an organic or inorganic halide as, for example, methylchloride, ammonia-chloride, carbon-tetrachloride, hydrochloric-acid, chloroform and other suitable compositions. The halogen content of the catalyst can be varied over considerably wide limits and thus it may be in the range of from about 0.01 up to as high as 10% by weight, but more usually the halogen content is maintained at less than about 5% by weight.

The method of the present invention is particularly concerned with a regeneration procedure suitable for restoring activity and selectivity of a bimetallic catalyst of the type above described. The bimetallic reforming catalyst becomes deactivated during use thereof by the deposition of carbonaceous material. To initiate regeneration of a used reforming catalyst, the flow of hydrocarbon feed to the catalyst is discontinued and the catalyst is then purged with a suitable gas or combination of gases to remove hydrocarbons and hydrogen from the catalyst bed. More particularly, shutdown of the reforming system includes the removal of hydrocarbons and hydrogen from the system to a level below about 2%. Thereafter the system is depressured with nitrogen and repressured with hydrogen to assure removal of hydrocarbons as well as hydrogen sulfide therefrom. If hydrogen sulfide is found to be greater than 1 p.p.m. vol. the system is again depressured and purged with nitrogen.

The regeneration of the catalyst begins as by pressuring the system up to about 30 to 50 lbs. p.s.i.g. with nitrogen and establishing a maximum circulation rate of the nitrogen with the recycle gas compressors. After establishing maximum nitrogen circulation in the system the reactor catalyst beds are heated to a temperature of 700° F. Air is then admitted to the circulating nitrogen gas stream in an amount to provide from about 0.2 up to 0.4% oxygen and passed to the inlet of reactor No. 1. This will initiate a burn of carbonaceous material on the catalyst in No. 1 reactor and after the burn is initiated the air rate to the reactor may be radually increased to provide a maximum burn rate without exceeding catalyst bed temperature limits of about 850 or 900° F. As oxygen breaks through the catalyst bed of the No. 1 reactor, it is carried by the effluent thereof into the bed of catalyst in reactor No. 2 and burning of carbonaceous material will initiate in reactor No. 2. The oxygen or air addition to the circulating gas is again carefully adjusted so that the oxygen content of the gas will not exceed limits which will increase the catalyst bed temperature above 850° F. or 900° F. Any water which is generated by the combustion and which accumulations in down-stream apparatus, such as the flash drum or pressure separators, or any other low areas of the system, should be drained therefrom. After an oxygen breakthrough occurs in reactor No. 2, burn of carbonaceous material in reactor 3 will start. Again care must be taken to adjust the oxygen concentration of the regeneration gas so as not to exceed undesired burn temperatures as practised in reactors 1 and 2. The initial burn of carbonaceous material during the regeneration step is completed when the catalyst bed temperature in all reactors is lined out at about 850° F. and no oxygen is being consumed. With the circulating gas stream limited in oxygen concentration within a range of 1 to 4 vol. percent, the temperature of the gas passed to all the reactor inlets is gradually increase to about 900° F. During this step it is important to check for any additional burn and regulate the oxygen level of the circulating gas and inlet temperatures to avoid exceeding a peak bed temperature of 925° F. When no further burning is found to occur the oxygen content of the circulating gas is gradually increased and the operation is continued for about 2 hours at 900° F. or until the concentration of $SO_2$ in the effluent gas therefrom is less than 1 p.p.m.

Upon completion of the above recited steps, particularly concerned with removing carbonaceous material by burning, the catalyst is subjected to progressively increasing concentrations of oxygen by adding air to the circulating gas stream until substantially pure air is contacting the catalyst at a temperature of about 900° F. The system is depressured as rapidly as possible to a low pressure which may be as low as 1 or 2 pounds to effect the removal of $CO_2$ from the system. Thereafter the reforming system is repressured to about 100 p.s.i.g. with air and the oxidation treatment is accomplished with air at 900° F. for at least 10 hours.

Chlorination of the regenerated catalyst begins with the system at about 100 p.s.i.g. with moisture laden air and the temperature of the catalyst beds adjusted to about 850° F. The steam injection is effected down-stream of the third reactor and the amount added is regulated to maintain a nearly constant water collection in the high pressure separator of the reforming operation down-stream of the point of water injection. Water collected in the high pressure separator should be frequently drained therefrom. With moisture saturation of the gas stream being initiated, reactant grade chlorine is then separately introduced to the inlet of each reactor at a temperature of at least about 800° F. in an amount which will restore the chloride level of the catalyst to that of the freshly prepared catalyst and without over chlorinating the catalyst. The addition rate is usually from 300 to 500 p.p.m. per vol. of circulating gas. However the concentration of chlorine added and the rate of addition should be carefully selected and controlled so that the catalyst requirement of each bed can be added during approximately a 3 hour treating period. Chlorine addition is stopped when a breakthrough is realized from a bed of catalyst and if this occurs before the theoretically predetermined amount is added, then the addition rate must be lowered or other suitable steps taken to complete chlorination. When chlorine addition is completed, the water saturated circulating air stream is continued for approximately 2 more hours to assure distribution of the chlorine in the catalyst. Thereafter the injection of steam to the circulating gas stream is stopped and the catalyst beds are cooled to about 500° F. At this point in the regeneration procedure the system or reforming unit is ready to be freed of oxygen. To accomplish this, it has been found desirable to reduce the pressure of the system to about 1 to 2 pounds and evacuate the reformer system to 25 inches Hg vacuum and check for leaks. This step need not be practised if desired. Following depressuring of the catalyst, the system is purged with nitrogen and pressured to about 5 p.s.i.g. More than one pressuring and depressuring step may be required to free the system of oxygen. When sufficiently purged, the system is then pressured with hydrogen and the catalyst is reduced at an elevated temperature above about 800° F. for a period of time selected from within the range of 1 to 4 hours. During this reduction of the catalyst with the hydrogen gas, a check is made for demethylation and in the event that some demethylation is found to occur presulfiding with hydrogen sulfide is started immediately at the inlet of No. 1 reactor. In addition the catalyst bed temperature is decreased to about 800° F. During sulfiding of the catalyst, it is proposed to add a theoretical amount of sulfur as hydrogen sulfide based on that required to sulfide the platinum content of the catalyst. After completing the sulfiding of the catalyst the reforming pressure may be raised to about 150 p.s.i.g. with hydrogen. Recycle gas dryers used in the reforming system may be put back in service at this point of the regeneration sequence. Furthermore, since the catalyst is at a temperature of about 800° F. and is ready for initiating the charge naphtha to the process, it is proposed that the charge naphtha be introduced at about 50% of design rate during this initial contact period and this is to be accomplished in conjunction with the addition of at least 150 p.p.m. of sulfur as hydrogen sulfide for the first one and one-half hours of operation.

BRIEF DESCRIPTION OF THE DRAWINGS

FIG. 1 graphically presents the effect of regeneration techniques on the performance of bimetallic catalysts with respect to the hydrogen purity of the recycle gas obtained during reforming with the regenerated catalyst.

FIG. 2 graphically presents the effect of regeneration techniques on the performance of bimetallic catalysts with respect to the temperature drop experienced in No. 1 reactor of a multiple reactor reforming operation.

Example

Samples of used bimetallic reforming catalyst were taken from the three reactors of a commercial reforming unit. Analyses of the samples taken are detailed in Table 1 below. Evaluation of the analyses leads one to conclude that the catalyst shows no evidence of deterioration in properties or an excessive metals accumulation. The catalyst sampled had been subjected to a relatively prolonged run and thus carbon contents of the samples was found quite high, ranging about 20% in No. 1, to 30–33% in Nos. 2 and 3 reactors. Catalyst chloride levels averaged 0.5 to 0.6% weight and thus were considered about normal. It is noted however that there has been some shift in the physical properties of the catalyst.

Several different regeneration procedures "A," "B," and "C" generally identified in Table 2 with procedure "C" more fully discussed above and start-up procedures identified in Table 3 were arranged and employed as a pilot plant program for evaluating the composite catalyst samples above identified. The results obtained by this regeneration-start-up study are graphically presented in FIGS. 1 and 2. The results plotted in FIGS. 1 and 2 show the superiority of the regeneration procedure C for restoring the activity and selectivity of the catalyst, determined as a function of produced $H_2$ gas purity and reactor temperature drop encountered during on-stream reforming operation of the regenerated catalyst.

TABLE 2

[Procedures for regenerating bimetallic catalyst from low pressure PtR]

| Regeneration procedure | Reference No. A | B | C |
|---|---|---|---|
| Pressure, p.s.i.g | 100 | 100 | 100 |
| Recycle gas system: | | | |
|   Molecular sieve dryer | No | Yes | No |
|   Caustic scrubber | Yes | No | No |
| HCl added, mol HCl/mol $H_2O$ | 1/20 | No | No |
| Main burn: | | | |
|   Inlet temperature, °F | [1] 750 | [1] 750 | [2] 700 |
|   Maximum bed temperature, °F | 840 | 840 | 850 |
|   $O_2$ concentration, percent mole | 0.6 | 0.6 | 0.7 |
| Clean-up: | | | |
|   Stage 1 ($O_2$ to 3%): | | | |
|     Bed temperature, °F | 750 | 750 | 850 |
|     Hours to 3% mole $O_2$ | 8 | 7 | 5 |
|   Stage 2 (raise temperature): | | | |
|     Bed temperature to °F | 900–950 | 900 | 900 |
|     Hours required | 3 | 7 | 2 |
|   Stage 3 ($O_2$ to 21%): | | | |
|     Bed temperature, °F | 900–950 | 900 | 900 |
|     Hours to 21% mole $O_2$ | 1 | 1.5 | 3 |
| | | Air soak | Rechlorination [3] |
| Oxidation (21% $O_2$): | | | |
|   Bed temperature, °F | 900–950 | 900 | 900 | 850 |
|   Time, hours | 3 | 16 | 10 | 4.5 |
| Catalyst properties: No. 1 reactor dehydrogenation activity | | 11.6 | 11.6 | |
| Chloride contents, percent wt.: | | | | |
|   No. 1 Reactor | 0.87 | 0.61 | 0.17 | 0.91 |
|   No. 2 Reactor | 1.06 | 0.52 | 0.13 | 0.88 |
|   No. 3 Reactor | 1.19 | 0.55 | 0.25 | 0.77 |

[1] Maintained throughout the burn.
[2] Individual inlet temperatures were raised slowly as burning progressed through each reactor to maintain the peak temperature near 850° F. The 850° F. inlet temperature was then maintained until burning was completed in subsequent reactors.
[3] After 10 hours in 21% $O_2$, trichloroethylene added to inlet of each reactor (300 p.p.m. mol Cl in circulating gas) to raise catalyst chloride level to 1% wt. during 2.5 hour period. Gas was circulated for an additional 2 hours.

TABLE 1

[Analyses of catalyst samples from low pressure PtR reforming]

| | Fresh catalyst | Unregenerated, aged catalyst | | | | | | | | |
|---|---|---|---|---|---|---|---|---|---|---|
| | | Reactor No. 1 | | | Reactor No. 2 | | | | Reactor No. 3 | | |
| | | | | | Bed depth, feet | | | | | | |
| | | Top | 1 | Composite [c] | Top | 1 | 2 | Composite [c] | Top | 3 | 5 | Composite [c] |
| Analyses: | | | | | | | | | | | | |
| Carbon, percent wt. of coked catalyst | | 16.7 | 17.2 | | 25 | 24 | 24 | | 23 | 23 | 23 | |
| Carbon, percent wt. of coke free catalyst [a] | <0.03 | 20.1 | 20.8 | 20.1 | 33.4 | 31.6 | 31.6 | 32.1 | 29.9 | 29.9 | 29.9 | 29.0 |
| Chloride, percent wt. of coke free catalyst [b] | 0.95 | 0.66 | 0.58 | 0.72 | 0.55 | 0.51 | 0.57 | 0.54 | 0.59 | 0.58 | 0.54 | 0.60 |
| Sulfur, percent wt. of coke free catalyst [b] | 0.04 | <0.03 | <0.03 | | <0.03 | <0.03 | <0.03 | | <0.03 | <0.03 | <0.03 | |
| Platinum crystal size, A | 22 | 20 | 23 | | 20 | 20 | 22 | | 20 | 20 | 20 | |
| Alumina crystal size, A | 50 | 45 | 45 | | 45 | 45 | 45 | | 45 | 45 | 45 | |
| Surface area, m.²/g | 195 | 189 | 180 | | 183 | 189 | 185 | | 186 | 172 | 179 | |
| Pore volume, cc./g | 0.803 | 0.915 | 0.927 | | 0.920 | 0.932 | 0.927 | | 0.894 | 0.890 | 0.894 | |
| Pore diameter, A | 165 | 194 | 206 | | 201 | 197 | 200 | | 192 | 207 | 200 | |
| Real density, g./cc | 3.54 | 3.48 | 3.63 | | 3.60 | 3.62 | 3.61 | | 3.10 | 3.07 | 3.08 | |
| Particle density, g./cc | 0.921 | 0.83 | 0.83 | | 0.84 | 0.83 | 0.83 | | 0.82 | 0.82 | 0.82 | |
| Dehydrogenation activity | 11.6 | | | Nil | | | | | | | | |
| Copper, p.p.m. wt | | 19 | | | 41 | | | | 58 | | | |
| Arsenic, p.p.m. wt | | <10 | <10 | | <10 | <10 | <10 | | <10 | <10 | <10 | |
| Lead, p.p.m. wt | | <20 | <20 | | 40 | <20 | <20 | | 50 | <20 | <20 | |
| Sodium, p.p.m. wt | | 200 | | | 200 | | | | 300 | | | |

[a] Calculated from analyses of coked catalyst.
[b] Analytical measurements made on coke free basis.
[c] These composites were used in the pilot plant regeneration studies.

TABLE 3

[Start-up procedures following regenerations of bimetallic catalyst from low pressure PtR]

| Regeneration procedure | A | B | C |
|---|---|---|---|
| Dry with nitrogen: | | | |
|   Pressure, p.s.i.g | 100 | 100 | No |
|   Recycle gas dryer | Yes | Yes | No |
|   Bed temperature, °F | 950–1,000 | 950 | No |
|   Time to <100 p.p.m. vol. $H_2O$, hrs | [1] 35.5 | 4 | No |
| Start-up: recycle gas dryer | Yes | Yes | [4] Yes |
| Reduction: temperature, °F | 950 | 950 | 900 |
| Stage 1: | | | |
|   Stepwise reduction at 100 p.s.i.g.[5] | Yes | Yes | No |
|   Time, hours | 1.25 | 1.5 | No |

See footnotes at end of table.

TABLE 3—Continued

| Regeneration procedure | A | B | C |
|---|---|---|---|
| Stage 2: | | | |
| Pressure, p.s.i.g | 250 | 250 | 250 |
| Hydrogen purity, percent mole | 100 | 100 | 100 |
| Time, hours | (5) | (5) | 2 |
| Presulfide with H₂S: | | | |
| Lb. H₂S/100 lb. catalyst | 0.05 | 0.065 | 0.065 |
| Theoretical H₂S based on PtS | 0.77 | 1 | 1 |
| Pressure (100% H₂), p.s.i.g | 250 | 250 | 250 |
| Temperature, °F | 700 | 700 | 800 |
| Sulfide with naphtha: | | | |
| Naphtha sulfur level, p.p.m. wt | No | 150 | 150 |
| Time, hours | No | 1.5 | 1.5 |
| Pressure (recycle gas), p.s.i.g | No | 250 | 250 |
| Temperature, °F | No | 800 | 800 |
| Rechlorinate with naphtha: | | | |
| Chloride level in charge, p.p.m. wt | No | ² 5 | No |
| Time, hours | No | ³ 4 | No |
| Pressure (recycle gas), p.s.i.g | No | 250 | No |
| Temperature, °F | No | 800 | No |

¹ Water contaminated sampling system, preventing accurate measurements, but did not contact catalyst.
² Tertiary butyl chloride was added to the inlets of each reactor to raise the catalyst level to 1.0% wt.
³ Total time for all three reactors. Individual times were: No. 1, 35 minutes; No. 2, 71 minutes; No. 3, 134 minutes.
⁴ Fast heat-up used so recycle gas still contained <1,000 p.p.m. H₂O.
⁵ (a) Added 1.0 SCFH₂ per cubic foot of catalyst and circulated for 1 hour; (b) Increased hydrogen content to 10-12% mole and circulated for fifteen minutes; (c) Depressured unit and repressured to 100 p.s.i.g. with 100% hydrogen circulated for 15 minutes then depressured again.
⁶ Immediately started reducing temperature for presulfiding.

Having thus provided a general discussion of the method and combination of steps of the present invention and presented specific examples in support thereof, it is to be understood that no undue restrictions are to be imposed by reason thereof except as defined in the following claims.

We claim:
1. A method of regenerating a reforming catalyst comprising a platinum group metal in combination with a metal halide complex of a metal selected from the group consisting of cerium, ruthernium, rhenium and yttrium dispersed on a porous inorganic oxide carrier which has been deactivated during reforming by the deposition of carbonaceous deposits thereon which comprises:
(a) initially removing carbonaceous deposits from the reforming catalyst at a temperature above 700° F. without exceeding a catalyst temperature of 925° F. by burning with an oxygen adjusted gaseous material containing moisture,
(b) after burning of carbonaceous deposits on the catalyst is accomplished with increased levels of oxygen containing gaseous material and the concentration of $SO_2$ in the effluent gas therefrom is less than 1 p.p.m., purging carbon dioxide from the catalyst and further contacting the catalyst with moisture saturated air for at least 10 hours without exceeding a temperature of about 900° F.,
(c) thereafter contacting the oxygen treated catalyst with moisture saturated air at a temperature above 800° F. to which a chlorinating agent is added in an amount sufficient to restore the reforming catalyst to a predetermined chloride level,
(d) continuously contacting the chloride restored catalyst with moisture saturated air at a temperature in the range of 800 to 950° F. for at least 2 hours,
(e) purging oxygen from the catalyst and then reducing the catalyst with hydrogen at an elevated temperature of above about 800° F. for a period of time from within the range of 1 to 4 hours, and
(f) thereafter sulfiding the reduced catalyst in the presence of hydrogen.

2. The method of claim 1 wherein chlorination of the catalyst is effected under conditions selected to provide a temperature of at least about 800° F. with chlorine added at a rate selected within the range of 300 to 500 p.p.m. per vol. to the circulating moisture saturated air stream.

3. The method of claim 1 wherein sulfiding of the catalyst is controlled to be just sufficient on a theoretical basis to effect sulfiding of the platinum type component of the reforming catalyst and a small amount of $H_2S$ is added during the initial phase of charging naphtha to the regenerated reforming catalyst.

References Cited
UNITED STATES PATENTS

| | | | |
|---|---|---|---|
| 3,496,096 | 2/1970 | Kluksdahl | 252—415 |
| 3,415,737 | 12/1968 | Kluksdahl | 208—139 |
| 3,243,384 | 3/1966 | Raarup, Jr. | 252—415 |
| 3,481,861 | 12/1969 | Hayes | 208—140 |
| 3,296,119 | 1/1967 | Bicek | 208—139 |
| 3,499,836 | 3/1970 | Hayes et al. | 208—138 |
| 3,554,902 | 1/1971 | Buss | 208—139 |
| 2,752,291 | 6/1956 | Rex | 252—417 |
| 3,634,292 | 1/1972 | Hayes | 252—415 |
| 3,637,524 | 1/1972 | Johnson et al. | 252—415 |
| 3,578,582 | 5/1971 | Jacobson | 208—140 |
| 3,617,520 | 11/1971 | Kluksdahl | 208—138 |
| 3,661,768 | 5/1972 | Davis Jr. et al. | 252—415 |

DANIEL E. WYMAN, Primary Examiner

P. E. KONOPKA, Assistant Examiner

U.S. Cl. X.R.

208—140; 252—419